No. 674,620. Patented May 21, 1901.
H. THUEMLER.
METHOD OF ORNAMENTING GLASS OR PORCELAIN WARE.
(Application filed Dec. 10, 1900.)
(No Model.)
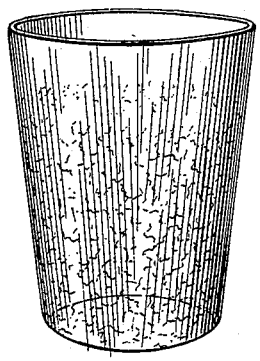
WITNESSES
INVENTOR

UNITED STATES PATENT OFFICE.

HUGO THUEMLER, OF PITTSBURG, PENNSYLVANIA.

METHOD OF ORNAMENTING GLASS OR PORCELAIN WARE.

SPECIFICATION forming part of Letters Patent No. 674,620, dated May 21, 1901.

Application filed December 10, 1900. Serial No. 39,261. (No specimens.)

*To all whom it may concern:*

Be it known that I, HUGO THUEMLER, of the city of Pittsburg, in the county of Allegheny and State of Pennsylvania, have invented a certain new and useful Improvement in Methods of Ornamenting Glass and Porcelain Ware, of which the following is a full, clear, and exact description, reference being had to the accompanying drawing, forming part of this specification, which is a side elevation of a tumbler having crackled ornamentation.

My invention relates to that class of ornamentation known in the art as "crackling" or "frosting" glass and porcelain ware.

Heretofore in order to produce the crackles in glassware the unfinished article on the end of the blowpipe used in the manufacture of the article has been dipped in water, which has the effect of producing crackles in the surface of the glass. The article was then subjected to heat sufficient to anneal and strengthen the same. Owing to the fact that it is necessary that only one surface of the glassware can be exposed to the action of the liquid to chill the same, the process of crackling has heretofore been confined almost exclusively to blown ware, in which the inner surface of the article on the blowpipe cannot come in contact with the liquid.

The object of my invention is to provide a method of crackling glass, either blown or pressed, and also porcelain and glass ware of every description, and to apply it to either a portion of the surface or to the entire outer surface of the article; and it consists in applying one surface of the article when in a heated condition to the surface of a moistened pad, roller, or other device, by means of which the moisture is applied to the surface of the article, and then annealing the article to strengthen the same.

I will now describe my invention, so that others skilled in the art may employ the same.

The glass article either in its heated condition in the process of manufacture or the finished article reheated to the required temperature is laid upon a pad of blotting-paper, asbestos, or any other suitable material which has been previously moistened with water or any other suitable liquid and pressed down on the same or rolled over the same with sufficient pressure to cause the moisture to be brought in intimate contact with the outer or exposed surface of the article, and this contact is maintained a sufficient length of time to crackle the glass or porcelain without breaking the same.

Instead of pressing the article against a moistened surface, such as a pad, the moistened surface in the form of a roller or a brush may be applied to or pressed against the article. The degree of heat required in the article and the amount of pressure and the length of the period of contact with the moistened surface must be determined by experience, as it will vary somewhat, according to the thickness of the glass and the composition of the glass.

I do not desire to limit myself to any particular kind of material to be used in the construction of the pad or other appliance, nor do I desire to limit myself to any one kind of liquid.

After the glass article has been crackled in the manner described it is again subjected to heat to anneal and strengthen the same.

The advantages of my invention will be apparent to those skilled in the art. It enables pressed ware and porcelain to be crackled as readily as the blown glassware, and by making the pad of certain shapes and sizes the crackling may be applied to only a portion of the article. It also enables all articles to be crackled with a very small percentage of breakage.

What I claim is—

1. The process of crackling glass, or porcelain, and like ware, consisting in applying the surface of the article when in a heated condition to a moistened surface.

2. The process of crackling glass, porcelain, and like ware, consisting in applying the same, when in a heated condition, to a moistened surface, and then reheating the crackled article.

In testimony whereof I have hereunto set my hand.

HUGO THUEMLER.

Witnesses:
JAMES W. PRESCOTT,
JAMES K. BAKEWELL.